(12) United States Patent
Brothers et al.

(10) Patent No.: US 7,147,055 B2
(45) Date of Patent: Dec. 12, 2006

(54) CEMENT COMPOSITIONS WITH IMPROVED CORROSION RESISTANCE AND METHODS OF CEMENTING IN SUBTERRANEAN FORMATIONS

(75) Inventors: Lance E. Brothers, Chickasha, OK (US); Anthony V. Palmer, Ardmore, OK (US); William J. Caveny, Rush Springs, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 227 days.

(21) Appl. No.: 10/774,800

(22) Filed: Feb. 9, 2004

(65) Prior Publication Data

US 2004/0211562 A1 Oct. 28, 2004

Related U.S. Application Data

(63) Continuation-in-part of application No. 10/423,207, filed on Apr. 24, 2003, now Pat. No. 6,904,971.

(51) Int. Cl.
*E21B 33/138* (2006.01)

(52) U.S. Cl. .................................... 166/293; 106/692

(58) Field of Classification Search ................ None
See application file for complete search history.

(56) References Cited

U.S. PATENT DOCUMENTS

| | | | |
|---|---|---|---|
| 2,250,107 A | 7/1941 | Nelles | 106/97 |
| 3,180,748 A | 4/1965 | Holmgren et al. | 106/104 |
| 3,782,985 A | 1/1974 | Gebbhardt | 106/97 |
| 3,901,316 A | 8/1975 | Knapp | 166/250 |
| 4,111,710 A | 9/1978 | Pairaudeau et al. | 106/90 |
| 4,217,144 A | 8/1980 | Mathieu | 106/104 |
| 4,256,503 A | 3/1981 | Tsuda et al. | 106/100 |
| 4,304,298 A | 12/1981 | Sutton | 166/293 |
| 4,310,486 A | 1/1982 | Cornwell et al. | 264/309 |
| 4,340,427 A | 7/1982 | Sutton | 106/87 |
| 4,367,093 A | 1/1983 | Burkhalter et al. | 106/87 |
| 4,397,354 A | 8/1983 | Dawson et al. | 166/294 |
| 4,450,010 A | 5/1984 | Burkhalter et al. | 106/87 |
| 4,460,052 A | 7/1984 | Gockel | 175/72 |
| 4,498,995 A | 2/1985 | Gockel | 252/8.5 LC |
| 4,537,918 A | 8/1985 | Parcevaux et al. | 523/130 |
| 4,565,578 A | 1/1986 | Sutton et al. | 106/87 |
| 4,596,834 A | 6/1986 | Widener et al. | 521/83 |
| 4,635,724 A | 1/1987 | Bruckdorfer et al. | 166/268 |
| 4,721,160 A | 1/1988 | Parcevaux et al. | 166/293 |
| 4,767,460 A | 8/1988 | Parcevaux et al. | 106/90 |
| 4,784,223 A | 11/1988 | Worrall et al. | 166/287 |
| 4,916,012 A | 4/1990 | Sawanobori et al. | 428/367 |
| 4,927,462 A | 5/1990 | Sugama | 106/99 |
| 5,032,181 A | 7/1991 | Chung | 106/717 |
| 5,120,367 A | 6/1992 | Smith et al. | 106/823 |
| 5,147,565 A | 9/1992 | Bour et al. | 252/8.551 |
| 5,159,980 A | 11/1992 | Onan et al. | 166/294 |
| 5,185,389 A | 2/1993 | Victor | 524/2 |
| 5,250,578 A | 10/1993 | Cornwell | 521/83 |
| 5,258,222 A | 11/1993 | Crivelli | 428/323 |
| 5,307,876 A | 5/1994 | Cowan et al. | 166/293 |
| 5,339,903 A | 8/1994 | Eoff et al. | 166/293 |
| 5,340,397 A | 8/1994 | Brothers | 106/727 |
| 5,391,226 A | 2/1995 | Frankowski | 106/696 |
| 5,453,310 A | 9/1995 | Andersen et al. | 428/34.4 |
| 5,456,751 A | 10/1995 | Zandi et al. | 106/724 |
| 5,588,489 A | 12/1996 | Chatterji et al. | 166/293 |
| 5,624,489 A | 4/1997 | Fu et al. | 106/692 |
| 5,681,452 A | 10/1997 | Kirkbride | 208/390 |
| 5,696,059 A | 12/1997 | Onan et al. | 507/269 |
| 5,779,787 A | 7/1998 | Brothers et al. | 106/802 |
| 5,791,380 A | 8/1998 | Onan et al. | 138/149 |
| 5,820,670 A | 10/1998 | Chatterji et al. | 106/727 |
| 5,900,053 A | 5/1999 | Brothers et al. | 106/678 |
| 5,989,336 A | 11/1999 | Carpenter et al. | 106/811 |
| 6,063,738 A | 5/2000 | Chatterji et al. | 507/269 |
| 6,143,069 A | 11/2000 | Brothers et al. | 106/678 |
| 6,220,354 B1 | 4/2001 | Chatterji et al. | 166/293 |
| 6,230,804 B1 | 5/2001 | Mueller et al. | 166/293 |
| 6,279,652 B1 | 8/2001 | Chatterji et al. | 166/194 |
| 6,308,777 B1 | 10/2001 | Chatterji et al. | 166/293 |
| 6,332,921 B1 | 12/2001 | Brothers et al. | 106/692 |
| 6,457,524 B1 | 10/2002 | Roddy | 166/293 |
| 6,458,198 B1 | 10/2002 | Baret et al. | 106/644 |
| 6,488,763 B1 | 12/2002 | Brothers et al. | 106/692 |
| 6,500,252 B1 | 12/2002 | Chatterji et al. | 106/644 |
| 6,508,306 B1 | 12/2002 | Brothers et al. | 166/295 |
| 6,516,883 B1 | 2/2003 | Chatterji et al. | 166/293 |

(Continued)

FOREIGN PATENT DOCUMENTS

EP 0 704 410 A2 4/1996

(Continued)

OTHER PUBLICATIONS

Product Data Sheet entitled "Secar 60" dated Jan. 2001.

(Continued)

*Primary Examiner*—Zakiya W. Bates
(74) *Attorney, Agent, or Firm*—Craig W. Roddy; Baker Botts L.L.P.

(57) ABSTRACT

The present invention relates to subterranean well cementing operations, and more particularly, to cement compositions having improved corrosion resistance and methods of using such compositions in subterranean formations. The cement compositions generally include an unhydrated cement that includes a high alumina cement, a silica source, and a soluble phosphate; and a set retarder that includes a water soluble carboxylic acid. Optionally, other additives may be included, such as accelerants, dispersants, weighting agents, and the like.

23 Claims, No Drawings

U.S. PATENT DOCUMENTS

| | | | |
|---|---|---|---|
| 6,516,884 B1 | 2/2003 | Chatterji et al. | 166/294 |
| 6,569,232 B1 | 5/2003 | Castro et al. | 106/644 |
| 6,689,208 B1 | 2/2004 | Brothers | 106/794 |
| 6,739,806 B1 | 5/2004 | Szymanski et al. | 405/267 |
| 6,796,378 B1 * | 9/2004 | Reddy et al. | 166/293 |
| 2003/0066460 A1 | 4/2003 | Reddy et al. | 106/692 |
| 2004/0211564 A1 | 10/2004 | Brothers et al. | 166/293 |

FOREIGN PATENT DOCUMENTS

| | | |
|---|---|---|
| WO | WO 00/20350 | 4/2000 |
| WO | WO 01/25163 A1 | 4/2001 |

OTHER PUBLICATIONS

Publication entitled "Rubber-Tire Particles As Concrete Aggregate" by Neil Eldin et al. published in the Journal of Materials in Civil, Engineering, vol. 5, No. 4, pp. 479-496, dated Nov. 1993.

Publication entitled "The Properties of Rubberized Concretes" by I. Topcu published in the Cement and Concrete Research Journal, vol. 25, No. 2, pp. 304-310 (1995).

Publication entitled "Hot Alkali Carbonation of Sodium Metaphosphate Fly Ash/Calcium Aluminate Blend Hydrothermal Cements" by T. Sugama Published in the Cement and Concrete Research Journal, vol. 26, No. 11. pp. 1661-1672 (1996).

Publication entitled "Mullite Microsphere-Filled Light-weight Calcium Phosphate Cement Slurries For Geothermal Wells: Setting and Properties" by T. Sugama et al. published in the Cement and Concrete Research Journal, vol. 25, No. 6. pp. 1305-1310 (1995).

Publication entitled "Carbonation of Hydrothermally Treated Phosphate-Bonded Calcium Aluminate Cement" by T. Sugama, et al. published under the auspices of the U.S. Department of Energy, Washington, D.C. under contract No. DEA-AC02-76CH00016; undated, but aadmitted to be prior art.

Publication entitled "Lightweight CO2-Resistant Cements For Geothermal Well Completions" by Lawrence E. Kukacka et al., publisher unknown and undated, but admitted to be prior art.

Publication entitled "Microsphere-Filled Lightweight Calcium Phosphate Cement" by Toshifumi Sugama et al. under the auspices of the U.S. Department of Energy, Washington, D.C. under contract No. DE-AC02-76 CH00016; undated but admitted to be prior art.

Publication entitled "Interfaces and Mechanical Behaviors of Fiber-Reinforced Calcium Phosphate Cement Compositions" by T. Sugama, et al. prepared for the Geothermal Division U.S. Department of Energy; Department of Applied Science, Jun. 1992, but admitted to be prior art.

Publication entitled "Calcium Phosphate Cements Prepared By Acid-Base Reaction" by Toshifumi Suagama et al. published in the Journal of the American Ceramic Society vol. 75, No. 8, pp. 2076-2087 (1992(.

Publication entitled "TXI Energy Services Introduces Pressur-Seal ™ Hi Performance Lost Circulcation Material" dated Aug. 12, 1998.

Halliburton brochure entitled "Latex 2000 Cement Additive" dated 1998.

Halliburton brochure entitled "Pozmix® A Cement Additive" dated 1999.

Halliburton brochure entitled "Spherelite Cement Additive" dated 1999.

Halliburton brochure entitled "Thermalock™ Cement for Corrosive $CO_2$ Environments" dated 1999.

Halliburton brochure entitled "HR®-25 Cement Retarder" dated 1999.

Foreign communication from a related counterpart application dated Apr. 12, 2005.

Office action from U.S. Appl. No. 10/423,207, dated Sep. 1, 2004.
Office action from U.S. Appl. No. 10/974,504, dated Mar. 13, 2006.
Office action from U.S. Appl. No. 10/974,504 dated May 5, 2005.
Office action from U.S. Appl. No. 10/974,504 dated Sep. 23, 2005.
Foreign communication from a related counterpart application dated Jul. 8, 2004.

* cited by examiner

CEMENT COMPOSITIONS WITH IMPROVED CORROSION RESISTANCE AND METHODS OF CEMENTING IN SUBTERRANEAN FORMATIONS

CROSS-REFERENCE TO RELATED APPLICATIONS

This application is a continuation-in-part of U.S. patent application Ser. No. 10/423,207 entitled "Cement Compositions With Improved Corrosion Resistance and Methods of Cementing in Subterranean Formations," filed Apr. 24, 2003, now U.S. Pat. No. 6,904,971 incorporated by reference herein for all purposes, and from which priority is claimed pursuant to 35 U.S.C. § 120.

BACKGROUND OF THE INVENTION

The present invention relates to subterranean well cementing operations, and more particularly, to cement compositions demonstrating improved corrosion resistance, and methods of using such cement compositions in subterranean formations.

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into an annular space between the walls of a well bore and the exterior surface of a pipe string disposed therein. The cement composition is permitted to set in the annular space, thereby forming an annular sheath of hardened substantially impermeable cement therein that substantially supports and positions the pipe string in the well bore and bonds the exterior surfaces of the pipe string to the walls of the well bore. Hydraulic cement compositions also are used in remedial cementing operations such as plugging highly permeable zones or fractures in well bores, plugging cracks and holes in pipe strings, and the like.

Portland cement is commonly used in subterranean cementing applications. Drawbacks may exist to using Portland cements in certain applications, however, because they are prone to corrosive attacks by carbonic acid ($H_2CO_3$). Carbonic acid may be naturally present in a subterranean formation, or it may be produced in the formation by the reaction of subterranean water and carbon dioxide ($CO_2$), when the latter has been injected into the formation, e.g., as in a $CO_2$-enhanced recovery operation. Carbonic acid is believed to react with calcium hydroxide that is present in Portland cement, which reaction may cause the cement to become a soft amorphous gel. This is problematic because, inter alia, it may increase the permeability of the cement. As a result, chloride and hydrogen sulfide ions, which may be present in the subterranean formation, may penetrate the cement sheath and adversely affect, or react with, the casing. The degradation of the cement can cause, inter alia, loss of support for the casing and undesirable interzonal communication of fluids.

The susceptibility of some cements, including Portland cements, to degradation by carbonic acid may be especially problematic in typical geothermal wells, which typically involve very high temperatures, pressures and carbon dioxide concentrations. In such wells, cement failures may occur in less than five years, causing the collapse of the well casing. This, in turn, may cause lost production and may necessitate expensive casing repairs.

SUMMARY OF THE INVENTION

The present invention relates to subterranean well cementing operations, and more particularly, to cement compositions demonstrating improved corrosion resistance, and methods of using such compositions in subterranean formations.

An example of a method of the present invention comprises providing a cement composition that comprises: an unhydrated cement comprising a high alumina cement, a silica source, and a soluble phosphate; and a set retarder comprising a water soluble carboxylic acid; placing the cement composition in a subterranean formation; and allowing the cement composition to set therein.

An example of a composition of the present invention is a cement composition that comprises: an unhydrated cement comprising a high alumina cement, a silica source, and a soluble phosphate; and a set retarder that includes a water-soluble carboxylic acid.

The features and advantages of the present invention will be readily apparent to those skilled in the art upon a reading of the description of the exemplary embodiments, which follows.

DESCRIPTION OF EXEMPLARY EMBODIMENTS

The present invention relates to subterranean well cementing operations, and more particularly, to cement compositions demonstrating improved corrosion resistance, and methods of using such compositions in subterranean formations.

The cement compositions of the present invention generally comprise an unhydrated cement comprising a high alumina cement, a silica source, and a soluble phosphate; a set retarder, and water sufficient to form a pumpable slurry. The cement compositions of the present invention generally have a density that may range from about 6 lb/gallon to about 23 lb/gallon. In certain exemplary embodiments, the density of the cement compositions of the present invention may range from about 14 lb/gallon to about 16 lb/gallon. In certain exemplary embodiments, the cement compositions of the present invention can be low-density cement compositions, e.g., foamed cement compositions or cement compositions comprising microspheres.

The cement compositions of the present invention comprise an unhydrated cement that comprises a high alumina cement, a silica source, and a soluble phosphate. Any high alumina cements that are suitable for use in subterranean applications may be suitable for use in the cement compositions of the present invention. As referred to herein, the term "high alumina cement" will be understood to mean a cement having an alumina concentration within the range of about 40% to about 80% of the weight of the high alumina cement. An example of a suitable high alumina cement is commercially available under the trade designation "SECAR-60," available from the LaFarge Corporation of Chesapeake, Va. Generally, the high alumina cement is present in the cement compositions of the present invention in an amount in the range of from about 20% to about 80% by weight of the unhydrated cement. In certain exemplary embodiments, the high alumina cement may be present in the cement compositions of the present invention in an amount in the range of from about 30% to about 70% by weight of the unhydrated cement.

Generally, the silica source used in accordance with the present invention comprises vitrified shale, fly ash, or a mixture thereof. Generally speaking, the silica source is present in the cement compositions of the present invention in an amount sufficient to provide a desired degree of corrosion resistance. In certain exemplary embodiments, the silica source may be present in the cement compositions of the present invention in an amount in the range of from about 20% to about 80% by weight of the unhydrated cement. In certain exemplary embodiments, the silica source may be present in the cement compositions of the present invention in an amount in the range of from about 30% to about 70% by weight of the unhydrated cement. Where the silica source comprises vitrified shale, any type of vitrified shale may be used in the cement compositions of the present invention. An example of a suitable vitrified shale is commercially available under the tradename of "PRESSUR-SEAL® FINE LCM" from TXI Energy Services, Inc., in Houston, Tex. As noted previously, the silica source also may comprise fly ash. The term "fly ash" will be understood to refer to the finely divided residue that results from the combustion of ground or powdered coal and that is carried by flue gases generated by power plants. In certain exemplary embodiments of the present invention where the silica source comprises fly ash, the fly ash may be ASTM class F fly ash, which is a fine particle size ASTM class F fly ash having a Blaine fineness of about 10,585 cm$^2$/gram that is commercially available from Halliburton Energy Services, Inc., of Houston, Tex., under the trade designation "POZ-MIX®."

Any type of soluble phosphate may be used in the cement compositions of the present invention, including, but not limited to, vitreous sodium phosphates, sodium hexametaphosphate, sodium polyphosphate, or mixtures thereof. An example of a suitable soluble phosphate is commercially available from Calgon Corporation in Pittsburgh, Pa., under the tradename of "CALGON." In general, the soluble phosphate is present in the cement compositions that are of the present invention in an amount sufficient to provide a desired degree of corrosion resistance. The soluble phosphate can be included in the cement compositions of the present invention in an amount in the range of from about 1% to about 10% by weight of the unhydrated cement. When included, it is believed that, inter alia, the soluble phosphate combines with calcium aluminate that may be present in the high alumina cement to form calcium phosphate in the form of hydroxyapatite. This reaction product may be resistant to corrosion.

The set retarders used in the cement compositions of the present invention generally comprise a water-soluble carboxylic acid. Examples of suitable water-soluble carboxylic acids include, but are not limited to, malic acid, lactic acid, acetic acid, tartaric acid, citric acid, and formic acid. Generally, the set retarder is included in the cement compositions of the present invention in an amount sufficient to retard the setting of the cement composition until a desired time after the cement composition has been placed in a subterranean formation. More particularly, the set retarder may be included in the cement compositions of the present invention in an amount in the range of from about 0.1% to about 5% by weight of the unhydrated cement.

The cement compositions of the present invention further comprise water, which may be from any source provided that it does not contain an excess of compounds that adversely affect other compounds in the cement composition. For example, a cement composition of the present invention may comprise fresh water, salt water (e.g., water containing one or more salts dissolved therein), brine, or seawater. The water may be present in an amount sufficient to form a pumpable slurry. More particularly, the water may be present in the cement compositions of the present invention in an amount in the range of from about 30% to about 50% by weight of the unhydrated cement. In certain exemplary embodiments, the water may be present in the cement compositions of the present invention in an amount in the range of from about 35% to about 45% by weight of the unhydrated cement.

Optionally, the cement compositions of the present invention may be low-density cement compositions. For example, the cement compositions of the present invention may comprise foamed cement compositions. When foamed, the cement compositions may include an expanding additive present in an amount sufficient to foam the cement composition to a desired density. Optionally, where the cement composition is foamed, foaming agents and/or foam stabilizing agents may be included in the cement composition in order to facilitate the foaming. An example of a suitable foaming agent is "ZONESEAL 2000™," commercially available from Halliburton Energy Services, Inc., of Houston, Tex., which is described in U.S. Pat. No. 6,063,738, the relevant disclosure of which is incorporated herein by reference. When used, the foaming agent and/or foam stabilizing agent may be present in the cement compositions of the present invention in an amount sufficient to generate a stable foam. In certain exemplary embodiments, the foaming agent and/or foam stabilizing agent may be present in the cement compositions of the present invention in an amount in the range of from about 1% to about 2% by weight of the water in the composition.

Optionally, the cement compositions of the present invention may further comprise an expanding additive utilized to foam the cement composition. A gas such as air, nitrogen, or a mixture of both, may be used. In certain exemplary embodiments, nitrogen may be used. Where included, the expanding additive may be present in the cement composition in an amount sufficient to adjust the density of the cement composition to a desired value. In certain exemplary embodiments of the present invention where an expanding additive has been added to the cement composition, a density in the range of from about 10 to about 14 pounds per gallon may be suitable. In certain exemplary embodiments, the expanding additive may be present in the cement compositions of the present invention in an amount in the range of from about 5% to about 40% by volume of the cement composition.

Optionally, microspheres may be added, inter alia, to reduce the density of the cement composition. Any microspheres that are compatible with a subterranean cement composition, e.g., that are chemically stable over time upon incorporation into the cement composition, may be used. An example of a suitable microsphere is commercially available from Halliburton Energy Services, Inc., of Houston, Tex., under the tradename "SPHERELITE." Where included, the microspheres may be present in the cement compositions of the present invention in an amount sufficient to provide a cement composition having a density in a desired range. In certain exemplary embodiments, the microspheres may be present in the cement compositions of the present invention in an amount in the range of from about 10% to about 80% by weight of the unhydrated cement. The microspheres may be added to the cement compositions of the present invention by any suitable method, including by dry blending with the cement before the addition of a fluid such as water, by mixing with the fluid to be added to the cement, or by mixing with the cement slurry consecutively with, or after, the addition of the fluid. The microspheres may be pre-suspended in water and injected into the cement mix fluid or into the cement slurry as an aqueous slurry. In certain exemplary embodiments, the microspheres may be dry blended with the cement before the addition of water.

Optionally, the cement compositions of the present invention may include inert ground rubber particles, inter alia, to provide elasticity and ductility. In certain exemplary embodiments, such ground rubber particles are produced from tires, and are commercially available from Four D Corporation of Duncan, Okla. In certain exemplary embodiments, the ground rubber particles have a mean length of less than about ¼", and can pass through a filter having a mesh size of 10/20 and 20/30. Where included, the ground rubber particles may be present in the cement compositions of the present invention in an amount sufficient to provide a desired degree of ductility to the cement composition. In certain exemplary embodiments, the ground rubber particles may be present in the cement compositions of the present invention in an amount in the range of from about 10% to about 30% by weight of the unhydrated cement.

Optionally, the cement compositions of the present invention may include carbon fibers, in order to, inter alia, increase the tensile strength of the cement composition. Where added, the carbon fibers preferably have a high tensile strength and/or a high tensile modulus. In certain exemplary embodiments, to achieve certain of the advantages associated with the present invention, the tensile modulus of the fibers may exceed 180 GPa, and the tensile strength of the fibers may exceed 3000 MPa. The fibers preferably have a mean length of about 1 mm or less. In certain exemplary embodiments, the mean length of the carbon fibers is from about 50 to about 500 microns. Most preferably, the fibers have a mean length in the range of about 100 to about 200 microns. Preferably, they are milled carbon fibers. An example of suitable carbon fibers includes "AGM-94" carbon fibers commercially available from Asbury Graphite Mills, Inc., of Asbury, N.J. AGM-94 fibers have a mean length of about 150 microns and a diameter of about 7.2 microns. Another example of suitable carbon fibers includes the "AGM-99" carbon fibers, also available from Asbury Graphite Mills, Inc., which have a mean length of about 150 microns and a diameter of about 7.4 microns. Generally, the carbon fibers may be present in the cement compositions of the present invention in an amount sufficient to enable the set cement to achieve a desired tensile strength. In certain exemplary embodiments, the carbon fibers may be present in the cement compositions of the present invention in an amount in the range of from about 1% to about 15% by weight of the unhydrated cement.

Optionally, the cement compositions of the present invention may comprise suitable additives, including, but not limited to, accelerants, surfactants, fluid loss control additives, weighting materials, dispersants, or the like. An example of a suitable fluid loss control additive is a styrene-butadiene latex commercially available from Halliburton Energy Services, Inc., of Duncan, Okla., under the trade designation "LATEX 2000." Another example of a suitable fluid loss control additive is a cationic starch that is commercially available from National Starch, Inc., under the tradename "REDI BOND 5330."

An example of a method of the present invention comprises providing a cement composition that comprises: an unhydrated cement comprising a high alumina cement, a silica source, and a soluble phosphate; and a set retarder comprising a water soluble carboxylic acid; placing the cement composition in a subterranean formation; and allowing the cement composition to set therein.

To facilitate a better understanding of the present invention, the following examples of some of the exemplary embodiments are given. In no way should such examples be read to limit the scope of the invention.

EXAMPLE 1

A series of sample cement compositions of the present invention were prepared and tested as follows.

Sample Composition No. 1 comprised an unhydrated cement that comprised 47.5% SECAR 60 cement by weight, 47.5% fly ash by weight, and 5% sodium hexametaphosphate by weight. Water was added to this unhydrated cement in the amount of 39% by weight of the unhydrated cement.

Sample Composition No. 2 comprised an unhydrated cement that comprised 47.5% SECAR 60 cement by weight, 47.5% fly ash by weight, and 5% sodium hexametaphosphate by weight. Citric acid and tartaric acid were added to this unhydrated cement, each in the amount of 1.4% by weight of the unhydrated cement. Sample Composition No. 2 further comprised 39% water by weight of the unhydrated cement.

Sample Composition No. 3 comprised an unhydrated cement that comprised 47.5% SECAR 60 cement by weight, 47.5% vitrified shale by weight, and 5% sodium hexametaphosphate by weight. Sample Composition No. 3 further comprised 39% water by weight of the unhydrated cement.

Sample Composition No. 4 comprised an unhydrated cement that comprised 47.5% SECAR 60 cement by weight, 47.5% vitrified shale by weight, and 5% sodium hexametaphosphate by weight. Citric acid and tartaric acid were added to this unhydrated cement, each in the amount of 1.4% by weight of the unhydrated cement. Sample Composition No. 4 further comprised 39% water by weight of the unhydrated cement.

Sample Composition No. 5 comprised an unhydrated cement that comprised 47.5% SECAR 60 cement by weight, 47.5% vitrified shale by weight, and 5% sodium hexametaphosphate by weight. Citric acid and malic acid were added to this unhydrated cement, each in the amount of 1.4% by weight of the unhydrated cement. Sample Composition No. 5 further comprised 39% water by weight of the unhydrated cement.

The sample compositions were prepared at room temperature and subjected to thickening time and seven-day compressive strength testing at 220° F. per API Specification 10, except that thickening time measurements were not performed for either of Sample Composition Nos. 1 and 3. The results are set forth in the table below.

TABLE 1

| Sample Description | Silica Source | % Citric Acid | % Tartaric Acid | % Malic Acid | Thickening Time (hours:minutes) | Compressive Strength (psi) |
|---|---|---|---|---|---|---|
| Sample Composition No. 1 | Fly ash | 0 | 0 | 0 | Not Determined | 5260 |
| Sample Composition No. 2 | Fly ash | 1.4% | 1.4% | 0 | 15+ | 4340 |
| Sample Composition No. 3 | Shale | 0 | 0 | 0 | Not Determined | 4930 |

TABLE 1-continued

| Sample Description | Silica Source | % Citric Acid | % Tartaric Acid | % Malic Acid | Thickening Time (hours:minutes) | Compressive Strength (psi) |
|---|---|---|---|---|---|---|
| Sample Composition No. 4 | Shale | 1.4% | 1.4% | 0 | 4:13 | 64 |
| Sample Composition No. 5 | Shale | 1.4% | 0 | 1.4% | 3:52 | 4800 |

The above example illustrates, inter alia, that cement compositions of the present invention comprising malic acid are suitable for use in subterranean cementing applications.

EXAMPLE 2

Sample cement compositions of the present invention were prepared comprising an unhydrated cement that comprised 380 grams of vitrified shale from TXI Energy Services, 380 grams of SECAR 60 cement from LaFarge Corporation, and 40 grams of sodium phosphate. The sample cement compositions further comprised 311 grams of deionized water, and varying amounts of lactic acid from Sigma-Aldrich.

The sample compositions were prepared at room temperature and subjected to thickening time testing at 140° F. per API Specification 10. The results are set forth in the table below.

TABLE 2

| Sample Description | Lactic Acid (% by weight of the unhydrated cement) | Thickening Time (hours:minutes) |
|---|---|---|
| Sample Composition No. 6 | 1.0 | 0:48 |
| Sample Composition No. 7 | 1.2 | 0:59 |
| Sample Composition No. 8 | 1.3 | 1:17 |
| Sample Composition No. 9 | 1.4 | 9:15 |
| Sample Composition No. 10 | 1.5 | 12:18 |

The above example illustrates, inter alia, that lactic acid retards the hydration of cement compositions of the present invention.

EXAMPLE 3

Sample cement compositions of the present invention were prepared comprising an unhydrated cement that comprised 380 grams of vitrified shale from TXI Energy Services, 380 grams of SECAR 60 cement from LaFarge Corporation, and 40 grams of sodium phosphate. The sample cement compositions further comprised 311 grams of deionized water, and varying amounts of malic acid. The sample compositions were prepared at room temperature and subjected to thickening time testing at 140° F. per API Specification 10. The results are set forth in the table below.

TABLE 3

| Sample Description | Malic Acid (% by weight of the unhydrated cement) | Thickening Time (hours:minutes) |
|---|---|---|
| Sample Composition No. 11 | 1.4 | 6:12 |
| Sample Composition No. 12 | 1.5 | 6:39 |

The above example illustrates, inter alia, that malic acid retards the hydration of cement compositions of the present invention.

EXAMPLE 4

Sample cement compositions of the present invention were prepared comprising an unhydrated cement that comprised 380 grams of vitrified shale from TXI Energy Services, 380 grams of SECAR 60 cement from LaFarge Corporation, and 40 grams of sodium phosphate. The sample cement compositions further comprised 311 grams of deionized water, and varying amounts of acetic acid from J. T. Baker. The sample compositions were prepared at room temperature and subjected to thickening time testing per API Specification 10. The results are set forth in the table below.

TABLE 4

| Sample Description | Acetic Acid (% by weight of the unhydrated cement) | Thickening Time Test Temperature (° F.) | Thickening Time (hours:minutes) |
|---|---|---|---|
| Sample Composition No. 13 | 0.5 | 140 | 0:42 |
| Sample Composition No. 14 | 0.6 | 140 | 0:52 |
| Sample Composition No. 15 | 0.7 | 140 | 1:16 |
| Sample Composition No. 16 | 0.71 | 140 | 1:21 |
| Sample Composition No. 17 | 0.73 | 140 | 1:26 |
| Sample Composition No. 18 | 0.7375 | 140 | 7:25 |
| Sample Composition No. 19 | 0.74 | 140 | 7:55 |
| Sample Composition No. 20 | 0.75 | 140 | 9:34 |
| Sample Composition No. 21 | 0.8 | 140 | 12:04 |
| Sample Composition No. 22 | 1.0 | 200 | 16:04 |
| Sample Composition No. 23 | 2.0 | 200 | 0:15 gelled |
| Sample Composition No. 24 | 1.0 | 240 | 8:28 |

The term "gelled," as used in the above example, signifies that Sample Composition No. 23 experienced an increase in viscosity to such a state that it could not be pumped or tested.

The above example illustrates, inter alia, that acetic acid retards the hydration of cement compositions of the present invention.

EXAMPLE 5

Sample cement compositions of the present invention were prepared comprising an unhydrated cement that comprised 380 grams of vitrified shale from TXI Energy Services, 380 grams of SECAR 60 cement from LaFarge Corporation, and 40 grams of sodium phosphate. The sample cement compositions further comprised 311 grams of deionized water, and varying amounts of FE-2 (citric acid), HR-25 (tartaric acid), and malic acid. The sample compositions were prepared at room temperature and subjected to thickening time testing at 200° F. per API Specification 10. The results are set forth in the table below.

TABLE 5

| Sample Description | Citric Acid (% by weight of the unhydrated cement) | Malic Acid (% by weight of the unhydrated cement) | Tartaric Acid (% by weight of the unhydrated cement) | Thickening Time (hours:minutes) |
|---|---|---|---|---|
| Sample Composition No. 25 | 1.0 | 0.5 | 0.5 | 2:31 |
| Sample Composition No. 26 | 1.2 | 0.6 | 0.6 | 3:56 |
| Sample Composition No. 27 | 1.5 | 0.75 | 0.75 | 10:05 |

The above example illustrates, inter alia, that citric acid, malic acid, and tartaric acid, in combination, retards the hydration of cement compositions of the present invention.

EXAMPLE 6

Sample cement compositions of the present invention were prepared comprising an unhydrated cement that comprised 380 grams of vitrified shale from TXI Energy Services, 380 grams of SECAR 60 from LaFarge Corporation, and 40 grams of sodium phosphate. The sample cement compositions further comprised 311 grams of deionized water, varying amounts of "FE-2" (citric acid), and varying amounts of acetic acid from J. T. Baker. The sample compositions were prepared at room temperature and subjected to thickening time testing at 200° F. per API Specification 10. The resulting thickening times are set forth in the table below.

TABLE 6

| Sample Description | Citric Acid (% by weight of the unhydrated cement) | Acetic Acid (% by weight of the unhydrated cement) | Thickening Time (hours:minutes) |
|---|---|---|---|
| Sample Composition No. 28 | 1.0 | 0.5 | 1:09 |
| Sample Composition No. 29 | 1.0 | 0.7 | 1:41 |

The above example illustrates, inter alia, that citric acid and acetic acid, in combination, retards the hydration of cement compositions of the present invention.

EXAMPLE 7

Sample cement compositions of the present invention were prepared comprising an unhydrated cement that comprised 380 grams of vitrified shale from TXI Energy Services, 380 grams of SECAR 60 from LaFarge Corporation, and 40 grams of sodium phosphate. The sample cement compositions further comprised 311 grams of deionized water, varying amounts of "FE-2" (citric acid), and varying amounts of malic acid. The sample compositions were prepared at room and subjected to thickening time testing per API Specification 10. The results are set forth in the table below.

TABLE 7

| Sample Description | Citric Acid (% by weight of the unhydrated cement) | Malic Acid (% by weight of the unhydrated cement) | Thickening Time Test Temperature (° F.) | Thickening Time (hours:minutes) |
|---|---|---|---|---|
| Sample Composition No. 30 | 1.5 | 1.5 | 200 | 11:05 |
| Sample Composition No. 31 | 1.6 | 1.6 | 200 | 10:07 |
| Sample Composition No. 32 | 1.4 | 1.4 | 220 | 4:38 |

The above example illustrates, inter alia, that citric acid and malic acid, in combination, retards the hydration of cement compositions of the present invention.

EXAMPLE 8

Sample cement compositions of the present invention were prepared comprising an unhydrated cement that comprised 380 grams of vitrified shale from TXI Energy Services, 380 grams of SECAR 60 from LaFarge Corporation, and 40 grams of sodium phosphate. The sample cement compositions further comprised 311 grams of deionized water, and varying amounts of formic acid from Sigma-Aldrich. The sample compositions were prepared at room temperature and subjected to twenty-four hour compressive strength testing and thickening time testing at 140° F. per API Specification 10. The results are set forth in the table below.

TABLE 8

| Sample Description | Formic Acid (% by weight of the unhydrated cement) | Compressive Strength (psi) | Thickening Time (hours:minutes) |
|---|---|---|---|
| Sample Composition No. 33 | 0.625 | 652 | 1:51 |
| Sample Composition No. 34 | 0.650 | 262 | 7:47 |
| Sample Composition No. 35 | 0.687 | 291 | 8:21 |
| Sample Composition No. 36 | 0.750 | Not Determined | 11:22 |

The compressive strength of the samples was measured in a water bath at atmospheric pressure. No compressive strength measurement was made of Sample Composition No. 36.

The above example illustrates, inter alia, that formic acid retards the hydration of cement compositions of the present invention while maintaining acceptable compressive strength.

EXAMPLE 9

Sample cement compositions of the present invention were prepared comprising an unhydrated cement that comprised 380 grams of vitrified shale from TXI Energy Services, 380 grams of SECAR 60 from LaFarge Corporation, and 40 grams of sodium phosphate. The sample cement compositions further comprised 311 grams of deionized water, and varying amounts of "FE-2" and "HR-25." The sample compositions were prepared at room temperature and subjected to thickening time testing per API Specification 10. The samples were also subjected to twenty-four hour compressive strength testing at 140° F. per API Specification 10. The results are set forth in the table below.

TABLE 9

| Sample Description | Citric Acid (% by weight of the unhydrated cement) | Tartaric Acid (% by weight of the unhydrated cement) | Thickening Time Test Temperature (° F.) | Compressive Strength (psi) | Thickening Time (hours:minutes) |
|---|---|---|---|---|---|
| Sample Composition No. 37 | 0.9 | 0.9 | 110 | 2710 | 11:45 |
| Sample Composition No. 38 | 0.7 | 0.7 | 140 | 2479 | 1:20 |
| Sample Composition No. 39 | 0.8 | 0.8 | 140 | 877 | 1:56 |
| Sample Composition No. 40 | 0.9 | 0.9 | 140 | Not Determined | 4:56 |
| Sample Composition No. 41 | 1.0 | 1.0 | 140 | 277 | 6:07 |
| Sample Composition No. 42 | 1.4 | 1.4 | 140 | 313 | 6:50 |

The compressive strength of the samples was measured in a water bath at atmospheric pressure. No compressive strength measurement was made of Sample Composition No. 44.

The above example illustrates, inter alia, that citric acid and tartaric acid, in combination, retards the hydration of cement compositions of the present invention while maintaining acceptable compressive strength.

EXAMPLE 10

Sample cement compositions of the present invention were prepared comprising an unhydrated cement that comprised 380 grams of vitrified shale from TXI Energy Services, 380 grams of SECAR 60 from LaFarge Corporation, and 40 grams of sodium phosphate. The sample cement compositions further comprised 311 grams of deionized water, and varying amounts of "FE-2" (citric acid). The sample compositions were prepared at room temperature and subjected to thickening time testing at 110° F. and twenty-four hour compressive strength testing at 140° F. per API Specification 10. The results are set forth in the table below.

TABLE 10

| Sample Description | Citric Acid (% by weight of the unhydrated cement) | Compressive Strength (psi) | Thickening Time (hours:minutes) |
|---|---|---|---|
| Sample Composition No. 43 | 1.3 | Not Determined | 2:21 |
| Sample Composition No. 44 | 1.4 | 2280 | 2:29 |

The compressive strength of Sample Composition No. 48 was measured in a water bath at atmospheric pressure. No compressive strength measurement was made of Sample Composition No. 47.

The above example illustrates, inter alia, that citric acid retards the hydration of cement compositions of the present invention while maintaining acceptable compressive strength.

EXAMPLE 11

Sample cement compositions of the present invention were prepared comprising an unhydrated cement that comprised 380 grams of vitrified shale from TXI Energy Services, 380 grams of SECAR 60 from LaFarge Corporation, and 40 grams of sodium phosphate. The sample cement compositions further comprised 311 grams of deionized water, and varying amounts of "HR-25" (tartaric acid). The sample compositions were prepared at room temperature and subjected to thickening time testing at 110° F. and twenty-four hour compressive strength testing at 140° F. per API Specification 10. The results are set forth in the table below.

TABLE 11

| Sample Description | Tartaric Acid (% by weight of the unhydrated cement) | Compressive Strength (psi) | Thickening Time (hours:minutes) |
|---|---|---|---|
| Sample Composition No. 45 | 1.3 | Not Determined | 2:38 |
| Sample Composition No. 46 | 1.4 | 1118 | 3:13 |

No compressive strength measurement was made of Sample Composition No. 49.

The above example illustrates, inter alia, that tartaric acid retards the hydration of cement compositions of the present invention while maintaining acceptable compressive strength.

Therefore, the present invention is well adapted to carry out the objects and attain the ends and advantages mentioned as well as those that are inherent therein. While the invention has been depicted, described, and is defined by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the, appended claims, giving full cognizance to equivalents in all respects.

What is claimed is:

1. A method of cementing in a subterranean formation comprising the steps of:
providing a cement composition comprising an unhydrated cement that comprises a high alumina cement, a silica source, a soluble phosphate, and a set retarder comprising a water soluble carboxylic acid;
placing the cement composition into the subterranean formation; and
permitting the cement composition to set therein.

2. The method of claim 1 wherein the high alumina cement has an alumina concentration in the range of from about 40% to about 80% of the weight of the high alumina cement.

3. The method of claim 1 wherein the high alumina cement is present in the cement composition in an amount in the range of from about 20% to about 80% of the weight of the unhydrated cement.

4. The method of claim 1 wherein the silica source comprises vitrified shale.

5. The method of claim 4 wherein the silica source further comprises fly ash.

6. The method of claim 1 wherein the silica source is present in the cement composition in an amount in the range of from about 20% to about 80% by the weight of the unhydrated cement.

7. The method of claim 1 wherein the soluble phosphate is present in the cement composition in an amount in the range of from about 1% to about 10% by the weight of the unhydrated cement.

8. The method of claim 1 wherein the soluble phosphate comprises sodium hexametaphosphate, sodium polyphosphate, vitreous sodium phosphate, or mixtures thereof.

9. The method of claim 1 wherein the set retarder comprising the water-soluble carboxylic acid is present in the cement composition in an amount in the range of from about 0.1% to about 5% by weight of the unhydrated cement.

10. The method of claim 1 wherein the cement composition further comprises a fluid loss control additive, a weighting agent, a defoamer, a surfactant, mica, fumed silica, a salt, a dispersant, a formation conditioning agent, an expanding additive, microspheres, or an accelerant.

11. The method of claim 1 wherein the cement composition further comprises water.

12. The method of claim 11 wherein the water is fresh water, salt water, brine, sea water, or a mixture thereof.

13. The method of claim 11 wherein the water is present in the cement composition in an amount sufficient to form a pumpable slurry.

14. The method of claim 11 wherein the water is present in the cement composition in an amount in the range of from about 30% to about 50% by weight of the unhydrated cement.

15. The method of claim 1 wherein the cement composition has a density in the range of from about 6 pounds per gallon to about 23 pounds per gallon.

16. The method of claim 1 wherein the cement composition further comprises carbon fibers.

17. The method of claim 16 wherein the carbon fibers have a mean length of about 150 microns.

18. The method of claim 16 wherein the carbon fibers are present in the cement composition in an amount in the range of from about 1% to about 15% by weight of the unhydrated cement.

19. The method of claim 1 wherein the cement composition further comprises rubber particles.

20. The method of claim 19 wherein the rubber particles are present in the cement composition in an amount in the range of from about 10% to about 30% by weight of the unhydrated cement.

21. The method of claim 19 wherein the rubber particles have a mean length of less than about ¼".

22. The method of claim 1 wherein the cement composition is a low-density cement composition.

23. The method of claim 1 wherein the high alumina cement has an alumina concentration in the range of from about 40% to about 80% of the weight of the high alumina cement; wherein the high alumina cement is present in the cement composition in an amount in the range of from about 20% to about 80% by weight of the unhydrated cement; wherein the silica source comprises vitrified shale; wherein the silica source is present in the cement composition in an amount in the range of from about 20% to about 80% by weight of the unhydrated cement; wherein the soluble phosphate is sodium hexametaphosphate present in the cement composition in an amount in the range of from about 1% to about 10% by weight of the unhydrated cement; and wherein the set retarder is present in the cement composition in an amount in the range of from about 0.1% to about 5% by weight of the unhydrated cement.

* * * * *